W. E. WISE.
COMBINATION SLEIGH AND WHEELED VEHICLE.
APPLICATION FILED DEC. 29, 1913.
1,118,720.
Patented Nov. 24, 1914.
2 SHEETS—SHEET 1.
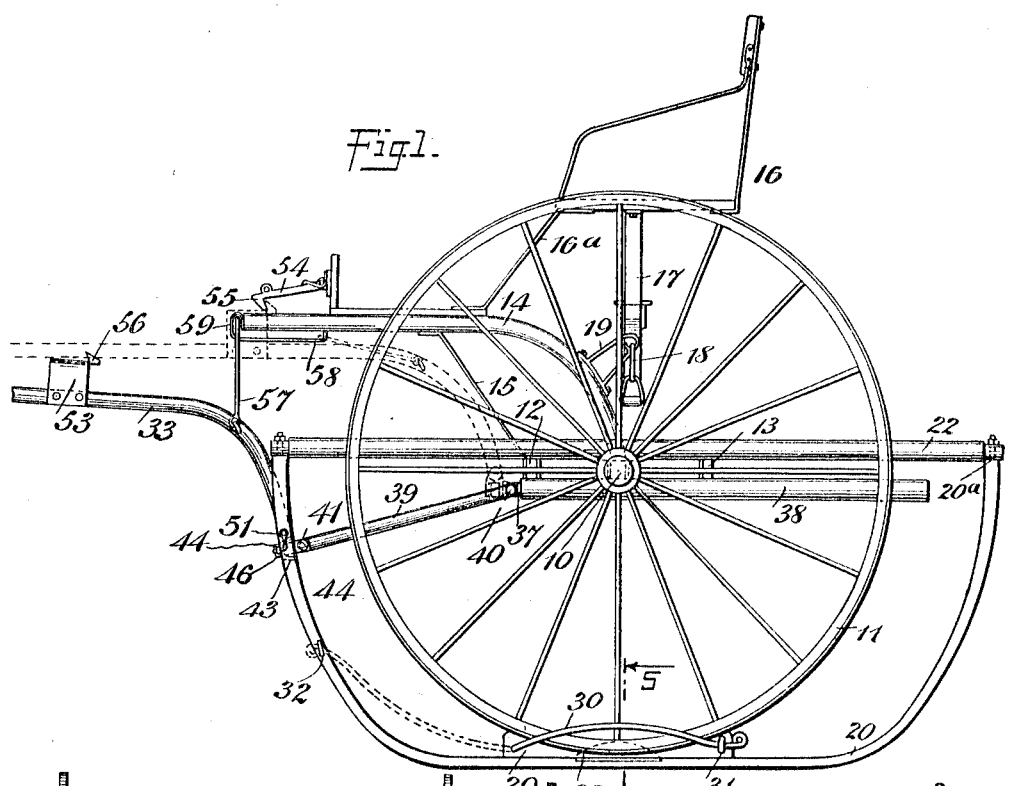

W. E. WISE.
COMBINATION SLEIGH AND WHEELED VEHICLE.
APPLICATION FILED DEC. 29, 1913.
1,118,720.
Patented Nov. 24, 1914.
2 SHEETS—SHEET 2.
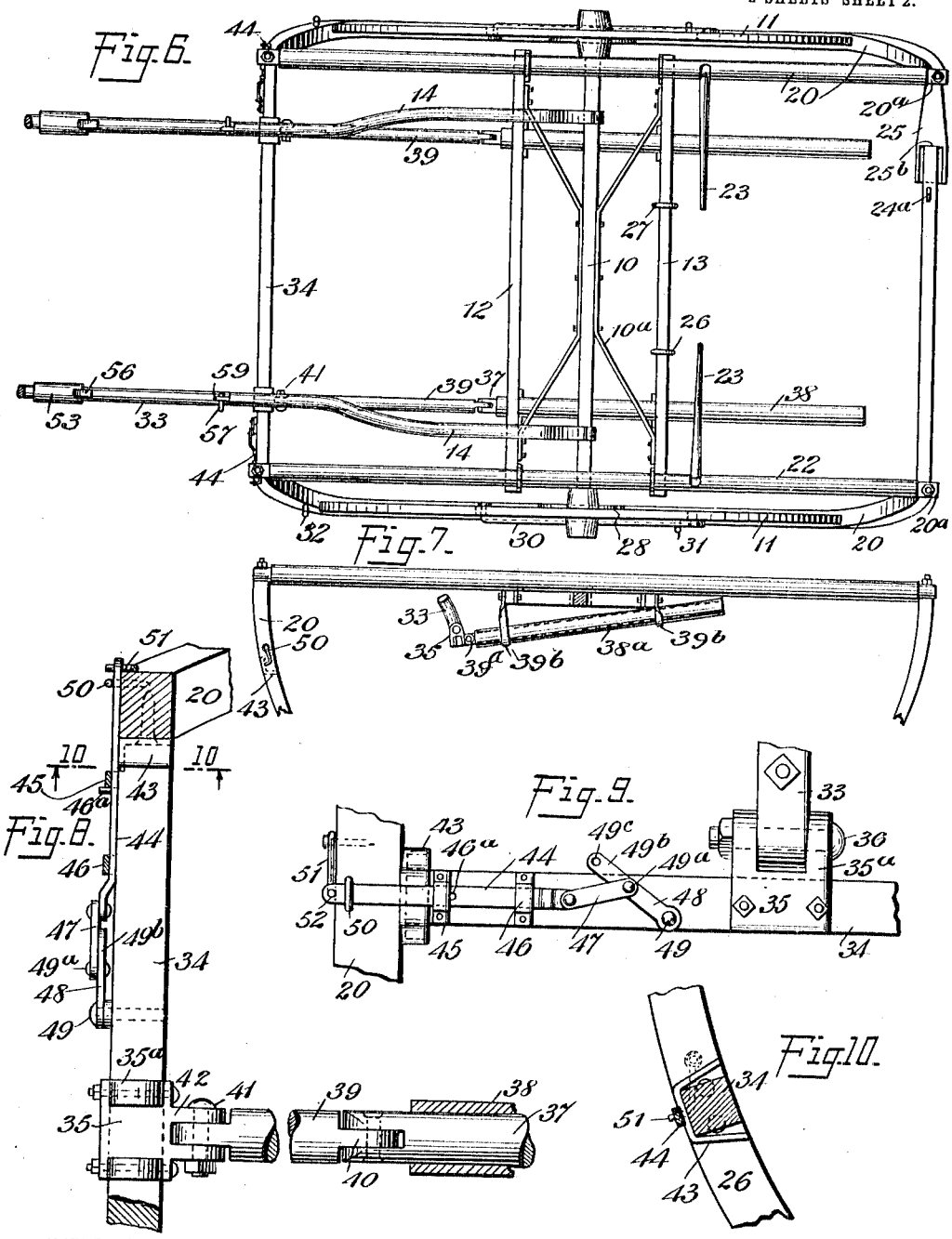

UNITED STATES PATENT OFFICE.

WILLIAM ELLIS WISE, OF WILLIAMSPORT, PENNSYLVANIA.

COMBINATION SLEIGH AND WHEELED VEHICLE.

1,118,720.  Specification of Letters Patent.  Patented Nov. 24, 1914.

Application filed December 29, 1913. Serial No. 809,234.

*To all whom it may concern:*

Be it known that I, WILLIAM ELLIS WISE, a citizen of the United States, and a resident of Williamsport, in the county of Lycoming and State of Pennsylvania, have invented a new and Improved Combination Sleigh and Wheeled Vehicle, of which the following is a full, clear, and exact specification.

The invention relates to a vehicle provided with running wheels, and with sleigh runners rockably mounted on the vehicle to take positions beneath the wheels, to convert the vehicle into a sleigh, or to a raised position when the vehicle is to be supported on its wheels.

The present invention relates particularly to a novel arrangement of the shafts or thills, and means for mounting the same so that the thills may be adjusted to a raised position when the vehicle is to be used as a wheeled vehicle, or to a lowered position when the sleigh runners are in use, and connected with said wheels. A sliding means is associated with the thills and is adapted to accommodate itself to the different positions of the thills in affording support for the latter.

The invention comprises also a novel means for mounting the runners and for bracing the same when in the lowered position.

The invention will be particularly explained in the specific description following.

Reference is to be had to the accompanying drawings forming a part of this specification, in which similar characters of reference indicate corresponding parts in all the views.

Figure 1 is a side elevation of a combination sleigh and wheeled vehicle embodying the invention; Fig. 2 is a rear elevation of the runners and a portion of the running gear of the vehicle, the runners being shown in the lowered position as when in use; Fig. 3 is a view similar to Fig. 2, showing the runners in the raised position, with the wheels resting on the ground; Fig. 4 is an enlarged detail side elevation with parts in vertical section, showing a slidable member which is associated with the shafts; Fig. 5 is a detail cross section on line 5—5 Fig. 1; Fig. 6 is a plan view with the seat and its appurtenances omitted; Fig. 7 is a fragmentary view in side elevation given to show a modification of the device shown in Fig. 4; Fig. 8 is a fragmentary plan view on an enlarged scale, given to show the means for clamping the thills to the runners, and the connection with the sliding member referred to; Fig. 9 is a front view of the parts shown in Fig. 7; and Fig. 10 is a cross section on the line 10—10 of Fig. 8.

In constructing a practical embodiment of the invention in accordance with the illustrated example, a suitable axle 10 is provided, mounting the running wheels 11, and cross bars 12 and 13 are provided at the front and rear of the axle and connected with the latter by suitable brace members $10^a$. It is to be understood that the frame parts and top of the vehicle may be variously arranged, those shown being of the general character associated with sulkies. I have shown frame elements 14, corresponding in form with the rear ends of the ordinary shafts of sulkies, there being suitable braces 15 extending upwardly from the forward cross bar 12 to the under side of the frame members 14. A seat 16 is supported on the frame in any approved manner, here shown as having standards $16^a$ connected with the members 14, there being a spring 17 at the under side of the seat connected by any suitable hangers 18, 19, on the spring and the frame members 14, respectively.

The runners 20 are of a size to be disposed beneath the wheels, there being one runner at each side, and at the upper end each runner is suitably secured to the longitudinal rock bar $20^a$, the ends of which project beyond longitudinal tubular bars 22 in which the bars $20^a$ are rockably mounted. To rock the runners, each bar $20^a$ is provided with a lever handle 23, whereby to exert a direct and effective leverage in raising or lowering the runners. A chain 21 may be provided, forming a connection between the runners, to limit the outward movement of the latter. To brace the runners in the lowered position, coacting brace members 24, 25, are provided on the respective runners, the member 24 being elongated and pivoted as at $24^a$, to the lugs $24^b$ on the runners, and the member 25 being in the form of a short lug or arm presenting a seat or socket $25^a$ at its outer end, there being an end flange $25^b$. The arrangement is such that the brace will break upwardly at the seat $25^a$, when raising the runners, and when the runners are in the lowered position, the member 24 will aline horizontally with the member 25, and seat itself thereon, with its end abutting the flange or inner end 25^b. The bar 24 may have an eye 24^c to receive any suitable hook for lifting said bar when the runners are to be raised. When in the raised position, the runners may be suspended by hangers 26, 27, depending from the rear cross bar 13 and having hooked lower ends, the hangers being free to rock on the bar 13, to engage or disengage the runners.

In order to clamp the runners to the wheels in position below the latter, each runner is provided with a suitable vertical stop flange 28 at the inner side of the runner, which is adapted to come to a bearing against the inner side of the wheel, at the bottom. There is provided also, on the runners, a concaved seat 29 at the outside of the flange 18, and a latch bar 30, which may be resilient, is pivoted at one end to the seat 29, to be swung to a position at the outside of the wheel, as in Fig. 1, the end of said latch bar being adapted to engage a hook 31 on the opposite end of the seat 29, whereby the wheel will be clamped between the flange 28 and the said latch bar 30. The latch bar, when the runner is to be raised, may be swung to a forward position indicated by dotted lines, Fig. 1, with its free end engaging a hook 32 on the runner, at the front.

The thills 33 are pivoted to a cross bar 34, fittings or clips 35 on the said bar having ears 35^a receiving the pivot bolts 36 for the thills. The cross bar 34, or other element appurtenant to the thills, has connection with a slide bar 37, adapted to be moved longitudinally in a tubular side bar 38 disposed beneath the tubular side bars 22, and the slide bar 37 being adapted to accommodate itself to the thills and the latter adapted to be moved from the lower position indicated in full lines, Fig. 1, to a raised position indicated by dotted lines according to whether the vehicle is to be running on the wheels 11, or the runners 20. The connection between the slide bars 37 and the thills, in the form shown in Figs. 1, 4, 6 and 8, is effected through the medium of a coupling bar 39 pivoted at its rear end as at 40, to the slide bar 37, and pivoted at their forward ends, as at 41, between ears 42 on the fitting 35, as seen best in Fig. 7. When the thills are raised, the coupling bars 39 are adapted to slide into the sleeve or hollow bar 38, following the movements of the slide bars 37, as shown in Figs. 1 and 4. In the form shown in Fig. 7, a slide bar 39^a is employed at each side, and is pivoted to the adjacent fitting 35, similarly to the bar 39. The bars 37 are however, omitted, each bar 39^a sliding directly in an inclined tubular bar 38^a which is suitably supported as by hangers 39^b on the adjacent main side bar 22.

In order to connect the thills with the runners when the latter are to be employed and the thills are lowered, the cross bar 34 is receivable at each end on a flaring seat 43 in rigid relation to the runners 20. The seats 43 face rearwardly and are disposed at the inner side faces of the runners. A latch or keeper bar 44 is mounted on the cross bar 34 of the thills, being slidable in keepers 45, 46, provided with a stop pin 46^a.

The inner end of the latch bar 44 is connected with one end of a member 47 of a toggle link, the companion member 48 of which is pivoted to the cross bar 34, as at 49, so that the operation of the toggle will slide the latch bar 46 to lock the runner to the cross bar 34, or to release said runner. To operate the toggle link, one member 48, is extended beyond the connecting pivot 49^a, as at 49^b, and is formed with an eye 49^c to receive a hook or other tool whereby to move the toggle link members on the said pivot 49^a to operate the latch bar 44. The said latch bars, when the cross bar 34 is placed in the sockets or flaring seats 43, may be slid through staples 50 on the runners, to lock them to the said cross bar. Any suitable means may be employed to secure the outer end of each latch bar, as for example, a hook 51, pivoted on the runner, and adapted to enter a pinhole 52 in the latch bar. It will thus be seen that the sliding bars 39 or 39^a, not only have connection with the thills through connection with the bars 34, but connect also with the runners, through the described intermediate elements, to brace the runners.

In order to establish connection between the thills and the frame members of the vehicle when the runners are out of use, and the thills are moved to the position shown in dotted lines, Fig. 1, I provide on the thills arched clips 53 adapted to slide over the forward ends of the bars 14, and latching means are provided, associated with the said clips and frame members 14, there being a spring-pressed latch 54 suitably mounted on the members 14, the hooked ends 55 of which are adapted to engage hooks 56 on the clips 53. I provide also on each thill 33 a pivoted hanger 57, which is hooked at its upper end to have sliding engagement with a longitudinal keeper 58 on each frame member 14, the said keeper desirably having an upwardly extending front end 59 so that the hanger bar 57 may accommodate itself to the movements of the thills.

The described construction affords a practical means for carrying my invention into effect, and I would state in conclusion that I do not limit myself strictly to the mechanical details herein illustrated, since manifestly the same can be considerably varied without departing from the spirit of the invention.

Having thus described my invention, I claim as new and desire to secure by Letters Patent:

1. A combined sleigh and wheeled vehicle, comprising a frame, running wheels thereon, runners movably mounted on the frame to assume raised or lowered positions, thills movably mounted to assume positions to connect with either the frame or runners, and means for securing the thills in either position.

2. A combined sleigh and wheeled vehicle comprising a frame, wheels thereon, runners movably mounted on the frame to assume raised or lowered positions, thills movable to positions to connect with either the frame or the runners, movable connections between the frame and thills, and means whereby to secure the thills to either the frame or runners.

3. A combined sleigh and wheeled vehicle comprising a supporting frame, wheels thereon, runners rockably mounted on the frame to assume positions beneath the wheels, or a raised position, thills, slidable supporting means connected with the thills and having support on the frame, and means for connecting the thills with the runners when the latter are in the lowered position.

4. In a combination sleigh and wheeled vehicle, a frame, running wheels thereon, runners mounted on the frame, thills for drawing the vehicle, said thills having slidable connection with the frame and being movable to a raised position or to a lowered position, there being means associated with said thills and with the said sliding means to clamp the runners when the latter are in the lowered position.

5. A combination wheeled vehicle and sleigh, comprising a wheeled frame, runners rockably mounted on the frame to assume positions beneath the wheels or a raised position, thills, a slidable connection between the thills and the vehicle frame, and means for connecting the thills with the runners when the latter are in the lowered position.

6. A combination wheeled vehicle and sleigh, comprising a wheeled frame, runners rockably mounted on the frame to assume positions beneath the wheels, or a raised position, thills, a slidable connection between the thills and the vehicle frame, means for connecting the thills with the runners when the latter are in the lowered position, and means for connecting the thills with the vehicle frame when the runners are in the raised position.

7. In a combination sleigh and wheeled vehicle, a frame, an axle on said frame provided with runner wheels, runners rockably mounted to assume positions beneath the wheels, or a raised position, draft thills, a connecting means between the thills and frame, means for clamping said thills to the runners when in the lowered position, and means for clamping the wheels to the runners.

8. In a combination sleigh and wheeled vehicle, a frame, an axle thereon provided with running wheels, rockably mounted runners movable to positions beneath the wheels or to raised positions, and a transverse brace comprising co-acting members on the respective runners and engageable with each other when the runners are in the lowered position.

9. In a combination sleigh and wheeled vehicle, a supporting axle provided with running wheels, runners rockably mounted to assume positions beneath the wheels or to raised positions, thills, a cross bar on said thills, slidable connections between the cross bar and the vehicle, and means for connecting the cross bar and the runners, when the latter are in the lowered position, said means comprising members on the cross bar, members on the runners adapted to receive the members on the cross bar, and latches carried by the cross bar and movable in the members thereof, to lock the same to the runners.

10. A combination wheeled vehicle and sleigh comprising a wheeled frame, runners mounted on the frame to assume raised or lowered positions, thills, bars pivotally connected with the thills, and inclined tubular guides in which the said bars are slidable.

In testimony whereof I have signed my name to this specification, in the presence of two subscribing witnesses.

WILLIAM ELLIS WISE.

Witnesses:
 Thos. J. M. Laird,
 Philip Zialer.

Copies of this patent may be obtained for five cents each, by addressing the "Commissioner of Patents, Washington, D. C."